May 7, 1929.  C. C. CURRIE  1,712,381
LUBRICATING MECHANISM
Filed Aug. 28, 1928
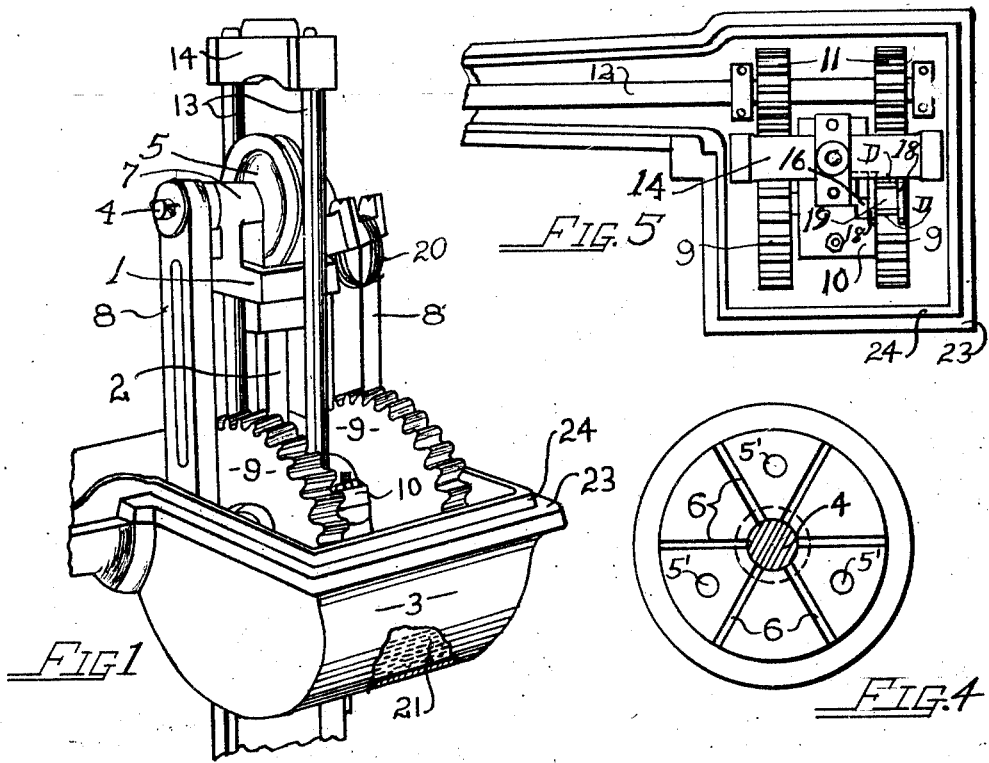
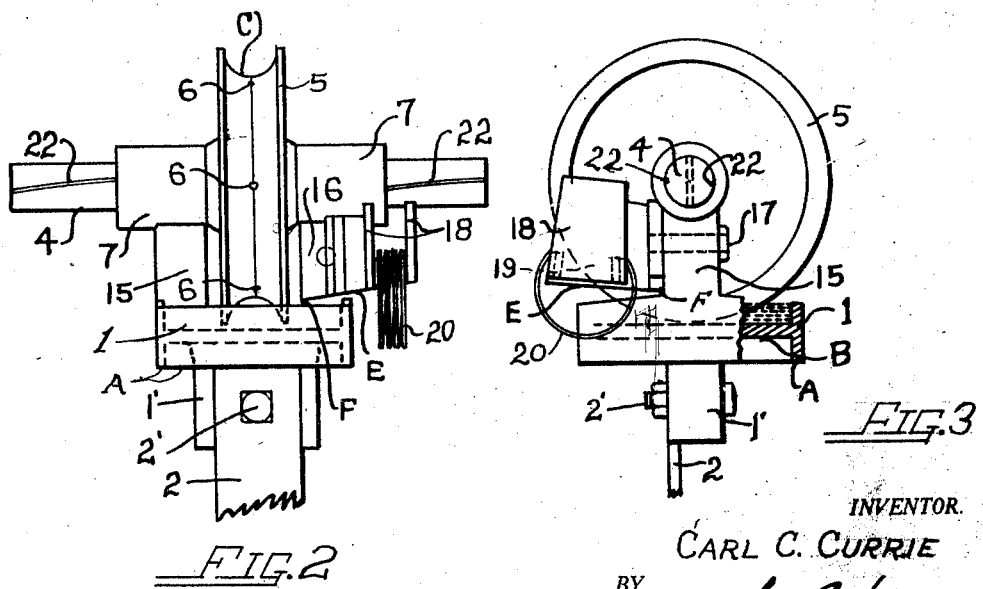
INVENTOR.
CARL C. CURRIE
BY
U. G. Charles
ATTORNEY.

Patented May 7, 1929.

1,712,381

UNITED STATES PATENT OFFICE.

CARL C. CURRIE, OF TOPEKA, KANSAS, ASSIGNOR OF ONE-HALF TO JOHN J. CURRIE, OF TOPEKA, KANSAS.

LUBRICATING MECHANISM.

Application filed August 28, 1928. Serial No. 302,489.

My invention relates to improvements in a lubricating mechanism.

The object of my invention is to provide a means by which the lubricant is transferred from one container to another, the latter being adapted to receive a rotatably arranged guiding means, the means partially submerging in the lubricant deposited in the container, the rotatable guiding means adapted to transfer the lubricant to its respective bearings and the bearings of the pump rod.

A further object of my invention is to provide a means that will more rapidly transmit the lubricant from a lower container to an upwardly positioned container.

A still further object of my invention is to provide an inexpensive means for the transfer of lubricant from the storage oil tank or housing for the gear of a windmill to a receptacle carried by the reciprocating rod of the windmill.

A still further object of my invention is to provide a hood for the gearing that is secured in place by a single bolt threadedly engaging in the crown block of the guide.

These and other objects will hereinafter be more fully explained, reference being had to the accompanying drawings forming a part of this specification, wherein like characters will apply to like parts throughout the different views.

Referring to the drawings:

Fig. 1 is a perspective view of a windmill gearing, the hood being removed.

Fig. 2 is an enlarged detail view of the guide sheave.

Fig. 3 is a transverse view of Fig. 2.

Fig. 4 is an inside view of the sheave, which is made in two parts, separable on the center zone.

Fig. 5 is a reduced plan view, the hood and spiral member being removed.

The invention, herein disclosed, consists of a lubricant receptacle or reservoir 1 carried by the pendent supporting means of the pump rod 2, the said rod engaging in a channeled lug 1' connected to the bottom of the reservoir and centrally positioned thereto, the rod being attached by a bolt 2'; said reservoir having a flange A peripherally positioned and downwardly extending from the bottom thereof. The flange A functions as a drip, should the lubricant carried by the receptacle overflow, by which means the lubricant will return to the housing 3, rather than to follow the bottom B of the reservoir, and from thence running down the shaft.

Trunnioned on a shaft 4 is a sheave guide wheel 5, the periphery of said wheel adapted to submerge in the lubricant deposit in the said lubricant reservoir, as shown in Fig. 3, and the said guide wheel being made in two parts divided on a center zone and having a plurality of grooves 6 on the inside of each half thereof, said grooves being placed in registry with each other, whereby ports are provided and radially positioned in the wheel, functioning as lubricant conveying means to the shaft 4. The wheel members are attached by rivets or screws engaging in apertures 5'.

The said shaft extends through the bearings 7 that are integrally connected to the lubricant receptacle, and on each of the outer ends of the shaft connecting arms 8 are pivotally engaged, the opposite ends of the arms eccentrically and pivotally connecting to a pair of gears 9 respectively, the gears being driven by a shaft to which they are rigidly attached (the shaft not being shown); the shaft is trunnioned in a bearing 10 that is centrally erected within the housing 3. The said gears are driven by a pair of pinions 11 meshing therewith respectively, the pinions being positioned as shown in Fig. 5 and being securely attached to a shaft 12. The said shaft 12 outwardly extends, having a wind wheel positioned thereon (the wheel not being shown), by which means the cross head and its co-acting elements are reciprocated and guided vertically by a pair of rods 13 that are rigidly connected to the boxing 10 at the lower ends, the upper ends being connected by a crown block 14; and being so positioned, the guide wheel 5 is free to move therebetween, the rods being seated in the concave C of said wheel. Therefore, the cross head and its respective shaft are vertically reciprocated.

Downwardly extending from each of the bearings 7 is a leg member 15 as pendent supporting means for receptacle 1. Securely attached to one of said leg members as shown in Fig. 3 is a bracket 16 by means of a bolt 17. The said bracket has upwardly extending sides 18 integral therewith as retaining means for the spirally wound member when in contact with gear 9, and an opening 19 positioned therebetween, through which lubricant may pass, as well as on the outsides thereof as at D—D, it being understood that the lubricating oil is conveyed thereto through the medium of an annular spirally arranged member 20, the member having a plurality of coils as shown in the drawings, each of the coils adapted to contact on the gear 9 vertically aligned therewith, so that the downward position of the cross-head will cause the coils of the spiral member to contact with the gear and be rotated thereby and receive the lubricant deposited thereon by the gear in its rotation, it being understood that the gears 9 are partially submerged in lubricating oil within the housing 3, and shown at 21 in Fig. 1. The oil deposit on the coils of the spirally arranged member will drain therefrom and be conveyed by the bracket following the underside of the bracket, which is slantingly positioned as shown at E, the low point F of which is positioned over the oil receptacle, keeping it well supplied at all times during the operation of the windmill.

It is now readily seen how the lubricant is conveyed through the apertures radially positioned in the guide wheel to the shaft 4 and to insure the conveyance of the oil to the outer ends of the shaft, I have provided a groove 22 spirally arranged thereon and extending from end to end. It is found, however, that the lubricant will travel to the outer ends without the use of the groove, as above stated, it being understood that the movement of the bearings with respect to the guide wheel and the bearings engaged on the shaft is very limited; in other words, the connecting arms merely rock thereon while the guide wheel is very apt to rotate reciprocatingly. The vertical reciprocations of the guide wheel within the guide members is well oiled at all times as the periphery of said wheel is in contact with the lubricant in the reservoir at all times.

As a means to inclose the gearing, I have arranged a hood member that the lower edge thereof will seat on the flange 23 and held in registry thereon by an upward extension 24, and having means to attach securely thereto by a screw threadedly engaging in the crown block.

While I have shown but one bracket with its spirally wound member, it will be understood that a second bracket and member may be placed on the opposite side to engage with the other large gear, whereby the supply of lubricant may be doubled.

I am aware that the gearing, herein disclosed, is old and generally used in the manufacturing of windmills; also the housing as an oil retaining means and in which the large gears are partially submerged and will carry the lubricant in their rotation. Such I do not claim broadly. Therefore, attention is more particularly directed to the spirally wound member consisting of a plurality of coils as a means to increase the carrying capacity of the lubricant to the bracket, and a bracket means having a two-point bearing for the coils and an opening intermediately positioned to the contact points, so that the surface is increased on which the lubricant will flow as it leaves the spiral member; the bracket then having its lower edges slanting towards and terminating at a point over an oil container functioning as a reservoir, by which means the reservoir is well supplied with lubricant during the operations of the windmill; it being understood, as heretofore stated, that the spirally wound member will contact with one of the large gears and rotated thereby. The large gear carrying a liberal supply of lubricant, the plurality of coils of the spirally wound member in contact therewith will transfer a liberal portion of the lubricant to the bracket, and during the period of idleness of the spiral member, the lubricant on the upper portion thereof will gradually drain onto the bracket, flowing toward and into the reservoir. The reservoir is also another feature, being integral with the bearings that carry the pump rod. With reference to the latter elements enumerated, such modifications may be employed as lie within the scope of the appended claims.

Having fully described my invention, what I claim as new and desire to secure by Letters Patent is:

1. In a lubricating mechanism, in combination with the gearing of a windmill, a reservoir integrally connected to the bearing of the pump rod, a bracket detachably arranged and carried by the pump rod bearing, the bracket having a two-point seat or contact, the contacts having openings therebetween, the lower side of the bracket sloping downward toward and over the reservoir, an annular spirally wound member having a plurality of coils to engage on the two points simultaneously, the said member to contact with the gear and rotated thereby at intervals as transmitting means for lubricant from the gear into the reservoir through the medium of the bracket as the pump rod reciprocates, a radially apertured guide wheel trunnioned on a shaft as conveying means for the lubricant to the shaft thereof, and means on the shaft to convey the lubricant longitudinally thereon.

2. In a lubricating mechanism, in combination with the pump rod bearing and gears of a windmill, a bracket having a pair of upwardly extending retaining elements and a two-point seat therebetween, whereby an opening is formed, the under side of the bracket sloping from the opening toward the bearing, a spirally wound element having a plurality of coils as gathering and conveying means for lubricant to the bracket, the lubricant following the slope of the bracket, a bifurcated bearing having a receptacle functioning as a reservoir and from which extends each leg of the bearing, and a pump rod connection oppositely and centrally positioned, a shaft and a guide wheel trunnioned thereon, the guide wheel made in two parts and being divided on its center zone, and each part having a plurality of radially positioned grooves extending from the outside and communicating with the center bearing, the grooves of each to register as conveying means for lubricant, the guide wheel having a concave peripherally arranged, and a pair of rods in parallelism to engage in the concave of the wheel on each side thereof as vertical guiding means therefor, the outer ends of the shaft functioning as a bearing for a connecting arm on each end thereof, the arms being actuated by the gearing on the windmill as reciprocating means for the pump rod.

3. In a lubricating mechanism, in combination with the guide wheel and shaft therefor, and gearing of a windmill, a lubricant receptacle having a pair of arms oppositely positioned to each other, and a bearing on the outer end of each of the arms and a leg outwardly extending from the bottom of the reservoir, to which the pump rod is attached, the reservoir having a flange peripherally positioned and laterally extending from the bottom thereof as a drip for lubricant overflowing from the reservoir, a bracket carried by one or both of the arms and being removably attached thereto, a pair of side members spaced apart and upwardly extending from the bracket, the lower end of the side members being joined by a pair of members spaced apart, whereby an opening is formed intermediate of all of said members, the bottom of the bracket having a downward slant toward its connection with the arm as drainage means from the outer end of the bracket, a spirally wound member having a plurality of coils, the member being pendently supported between the first said side members, as and for the purpose specified.

4. In a lubricating mechanism, in combination with the gearing and reciprocating means for the pump rod of a windmill, a reservoir for lubricant carried by the reciprocated element, and a bracket carried by the element, the bracket functioning as a lubricant conveying means to the reservoir, a spirally wound member having a plurality of coils and revolvable engaging on the bracket, the coils thereof to contact with the gearing during the extreme downward stroke of the reciprocated element, the gears being submerged in lubricant will supply the lubricant to the coils during the rotation thereof, and in turn, the coils will dispense the lubricant thereon to the bracket and freely flowing therefrom in to the reservoir, a guide wheel having a peripheral concave and being divided into two parts at its center zone, and a plurality of grooves radially positioned in each of the adjoined sides, whereby ports are provided conveying lubricant to the bearing of the wheel as the wheel rotates in the reservoir, and simultaneously oiling the peripheral concave of the wheel, all substantially as shown.

In testimony whereof I affix my signature.

CARL C. CURRIE.